(12) United States Patent
Siu et al.

(10) Patent No.: US 12,154,455 B2
(45) Date of Patent: *Nov. 26, 2024

(54) CAMERA AIDED SIMULATOR FOR MINIMALLY INVASIVE SURGICAL TRAINING

(71) Applicant: Board of Regents of the University of Nebraska, Lincoln, NE (US)

(72) Inventors: Ka-Chun Siu, Omaha, NE (US); Carl Nelson, Lincoln, NE (US); Mohsen Zahiri, Lincoln, NE (US); Dmitry Oleynikov, Omaha, NE (US)

(73) Assignee: Board of Regents of the University of Nebraska, Lincoln, NE (US)

( * ) Notice: Subject to any disclaimer, the term of this patent is extended or adjusted under 35 U.S.C. 154(b) by 416 days.

This patent is subject to a terminal disclaimer.

(21) Appl. No.: 17/746,100

(22) Filed: May 17, 2022

(65) Prior Publication Data

US 2022/0277667 A1 Sep. 1, 2022

Related U.S. Application Data

(63) Continuation of application No. 14/896,166, filed as application No. PCT/US2014/041302 on Jun. 6, 2014, now Pat. No. 11,361,678.

(Continued)

(51) Int. Cl.
*G09B 23/28* (2006.01)
*G09B 9/00* (2006.01)
(Continued)

(52) U.S. Cl.
CPC ........... *G09B 23/285* (2013.01); *G09B 23/28* (2013.01); *G09B 23/281* (2013.01);
(Continued)

(58) Field of Classification Search
None
See application file for complete search history.

(56) References Cited

U.S. PATENT DOCUMENTS

2009/0021752 A1 1/2009 Cohen et al.
2010/0072800 A1 3/2010 Weber et al.
(Continued)

OTHER PUBLICATIONS

Botden et al., "The importance of haptic feedback in laparoscopic suturing training and the additive value of virtual reality simulation", Surgical Endoscopy, vol. 22, No. 5, pp. 1214-1222, 2008 (Abstract Only).

(Continued)

*Primary Examiner* — James B Hull
(74) *Attorney, Agent, or Firm* — Nasr Patent Law LLC; Faisal K. Abou-Nasr

(57) ABSTRACT

The present disclosure is directed to a system and method for surgical training with low cost, reusable materials and a highly customizable virtual environment for skill-building. According to various embodiments, a surgical training tool is usable in conjunction with a support structure configured to at least partially constrain the tool movement. Meanwhile, the tool is tracked in real-time with off-tool detectors to generate a tool path driving a virtual rendering of the surgical training tool in an operative environment. The virtual rendering may be visually observable via a display device and may include a customizable and/or selectable operative environment with one or more structures that can be operated on by the virtual surgical training tool. By tracking the virtual tool interaction with the virtual structures, a task path may be established for documenting and/or objectively assessing the performance of one or more operative tasks.

20 Claims, 11 Drawing Sheets

Related U.S. Application Data

(60) Provisional application No. 61/831,884, filed on Jun. 6, 2013.

(51) Int. Cl.
*G09B 23/24* (2006.01)
*G09B 19/24* (2006.01)

(52) U.S. Cl.
CPC .............. *G09B 23/283* (2013.01); *G09B 9/00* (2013.01); *G09B 19/24* (2013.01)

(56) References Cited

U.S. PATENT DOCUMENTS

| | | |
|---|---|---|
| 2010/0167253 A1 | 7/2010 | Ryan et al. |
| 2010/0248200 A1 | 9/2010 | Ladak et al. |
| 2012/0082970 A1 | 4/2012 | Pravong et al. |
| 2012/0280988 A1 | 11/2012 | Lampotang et al. |
| 2013/0046523 A1 | 2/2013 | Van et al. |
| 2013/0323700 A1 | 12/2013 | Samosky et al. |
| 2014/0011173 A1 | 1/2014 | Tepper et al. |
| 2014/0226176 A1 | 8/2014 | Iwakami et al. |
| 2015/0079565 A1 | 3/2015 | Miller et al. |
| 2015/0356891 A1 | 12/2015 | Will |

OTHER PUBLICATIONS

Buzink et al., "Camera navigation and tissue manipulation: are these laparoscopic skills related?", Surgical Endoscopy, vol. 23, No. 4, pp. 750-757, 2009 (Abstract Only).

International Search Report dated Oct. 1, 2014 for International Appln. No. PCT/US2014/41302.

Lucas et al., "Training on a virtual reality laparoscopic simulator improves performance of an unfamiliar live laparoscopic procedure", The Journal of Urology, vol. 180, No. 6, pp. 2588-2591, 2008 (Abstract Only).

Stefanidis et al., "Construct and face validity and task workload for laparoscopic camera navigation: virtual reality versus videotrainer systems at the SAGES Learning Center", Surgical Endoscopy, vol. 21, No. 7, pp. 1158-1164, 2007 (Abstract Only).

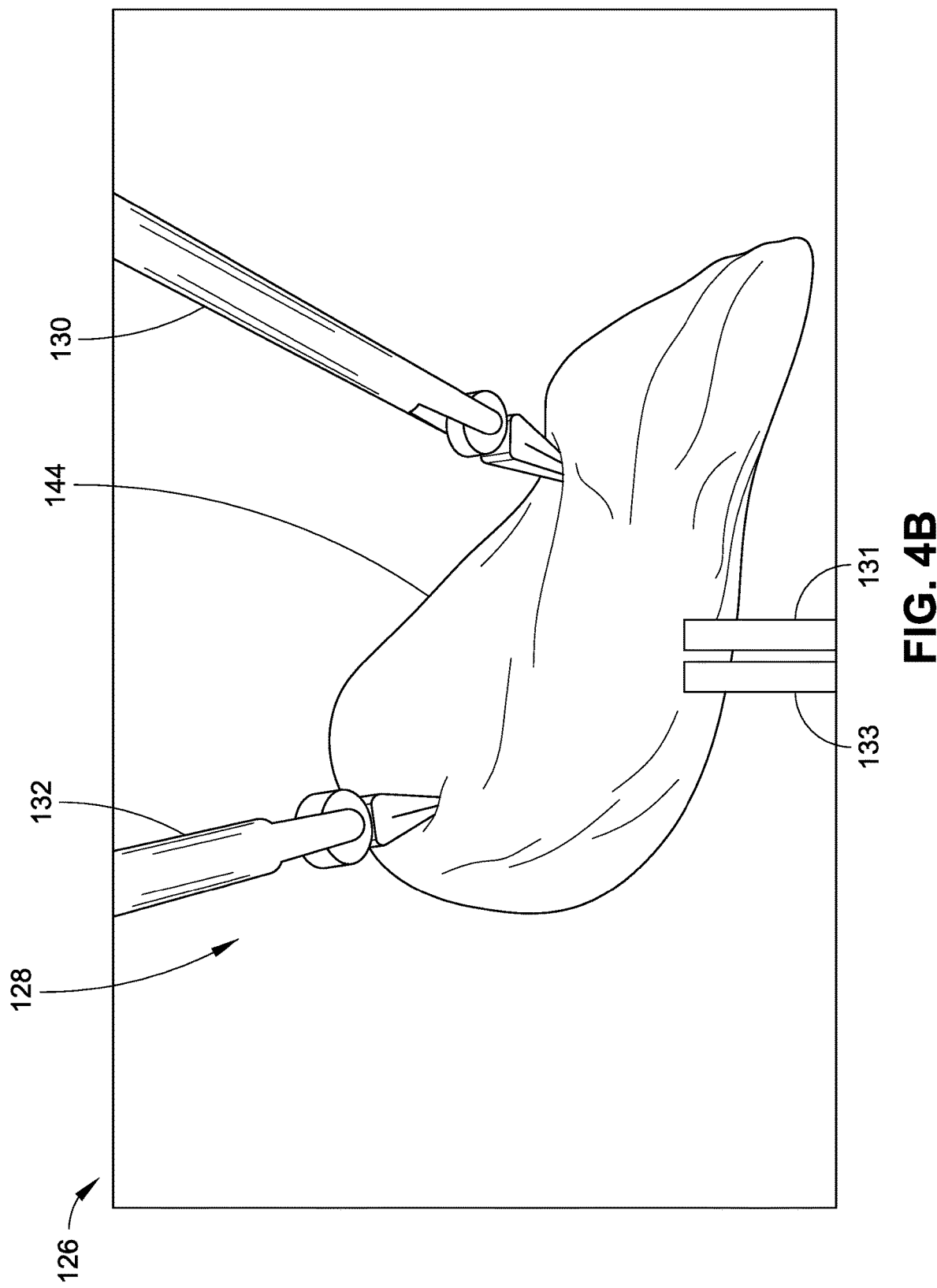

CAMERA AIDED SIMULATOR FOR MINIMALLY INVASIVE SURGICAL TRAINING

CROSS-REFERENCE TO RELATED APPLICATIONS

The present application is a Continuation of U.S. Nonprovisional application Ser. No. 14/896,166, titled PORTABLE CAMERA AIDED SIMULATOR (PortCAS) FOR MINIMALLY INVASIVE SURGICAL TRAINING, filed Dec. 4, 2015, which is a US National Stage Application under 35 USC 371 of International Application No. PCT/US2014/041302, titled CAMERA AIDED SIMULATOR FOR MINIMALLY INVASIVE SURGICAL TRAINING, which claims priority under 35 U.S.C. § 119(e) to U.S. Provisional Patent Application Ser. No. 61/831,884, titled PORTABLE CAMERA AIDED SIMULATOR (PortCAS) FOR MINIMALLY INVASIVE SURGICAL TRAINING, filed Jun. 6, 2013, all of which are hereby incorporated by reference.

TECHNICAL FIELD

The present disclosure generally relates to the field of surgical training systems and, more particularly, to a simulation system for minimally invasive surgical training.

BACKGROUND

Minimally invasive surgeries are highly favored in modern medicine due to the reduced trauma and rapid recovery rates. However, work hour restrictions have set a cap on the time that surgeons can train, and laparoscopic training is especially difficult when trainees can only spend a limited amount of time in the operating room. To make up for the reduced training time, trainees are urged to spend nonworking time mastering the fundamental skills of laparoscopic surgery.

Trainee evaluation is now standardized via the Fundamentals of Laparoscopic Surgery (FLS) offered by the Society of American Gastrointestinal and Endoscopic Surgeons (SAGES). The FLS program requires all trainees to acquire a special trainer box and testing materials to practice five simple tasks: peg transfer, precision cutting, ligating loop, and suturing with extracorporeal knot and intracorporeal knot. The trainer box and consumable materials increase the financial burden on trainees. Unfortunately, trainees also need to identify and travel to certain FLS testing centers with a trained FLS proctor to take the FLS test.

Simulation is one solution to increase the time that surgeons can train for laparoscopy. Availability of simulators in surgical residence programs is often limited, which hampers the ability of simulators to make additional training available for surgeons. Current simulators are costly and fail to provide trainees with the requisite training and assessment opportunities of the FLS program. There is a need in the art for low cost trainers that can adequately replace the consumable FLS materials while continuing to offer trainees the requisite skill-building exercises and an objective assessment of their mastery of the fundamental skills over time.

SUMMARY

In one aspect, this disclosure is directed to system for surgical training. In an embodiment, the system includes a surgical training tool including one or more fiducials and a support structure configured to receive the surgical training tool and constrain the tool movement within a volume. To some degree, the support structure may mimic the limited movement that would be encountered in a minimally invasive surgical environment. Additionally, the system includes at least two off-tool detectors configured to detect the position of the one or more fiducials. For example, a laparoscopic instrument, such as a grasper or a cutter, may be tracked by detecting the position of one or more fiducials associated with the positioning and orientation of the tool body and movement of the operative tool head (e.g., claw, prongs, scissor, needle, or razor blade).

The system may further include at least one processor in communication with the off-tool detectors. A tool path may be generated by the processor based on the detected position (e.g., three-dimensional coordinates) of the one or more fiducials. The tool path may by mapped by the processor to a virtual rendering of the surgical training tool in an operative environment. The virtual rendering may be visually observable via a display device, thereby enabling performance of an operative task within the virtual operative environment utilizing the virtual surgical training tool which is manipulated based on the tool path (e.g., the mapped position coordinates of the fiducials detected by real-time tracking of the surgical training tool). In further embodiments, the interaction between the virtual surgical training tool and one or more structures in the virtual operative environment may be translated into a task path by the processor. As discussed in further detail below, the task path can be analyzed in real-time, periodically, at specified triggering events, or post-performance of an operative task to establish an objective assessment of the task performance.

In another aspect, the disclosure is directed to a method of surgical training. In an embodiment, the method includes the steps of: detecting the position of one or more fiducials of a surgical training tool with at least two off-tool detectors; generating a tool path based on the detected position of the one or more fiducials; displaying a virtual rendering of the surgical training tool in a virtual operative environment, the virtual surgical training tool being manipulated in the virtual operative environment based on the tool path, thereby enabling performance of an operative task within the virtual operative environment utilizing the virtual surgical training tool; and generating a task path based on the tool path, the task path describing a path of the virtual surgical training tool in the virtual operative environment, the task path including position coordinates of the virtual surgical training tool relative to position coordinates of one or more structures being operated on by the virtual surgical training tool in the virtual operative environment.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 4B is a conceptual illustration of a visually observable virtual rendering of a surgical training tool in a virtual operative environment, in accordance with an embodiment of this disclosure;

DETAILED DESCRIPTION

Reference will now be made in detail to the subject matter disclosed, which is illustrated in the accompanying drawings.

FIGS. 1 through 7 generally illustrate embodiments of a system and method for surgical training. To alleviate the burdens of limited training time and the expenses associated with high-end simulators, the system described herein may include low cost, reusable materials and a highly customizable virtual environment for skill-building. As detailed below, the system may enable objective assessment of a trainee's performance of operative (skill-building) tasks by tracking a tool path of a surgical tool and translating the real-world tool operation (i.e., the tool path) into a simulated setting where operative tasks can be performed on virtual structures.

Figure 1:
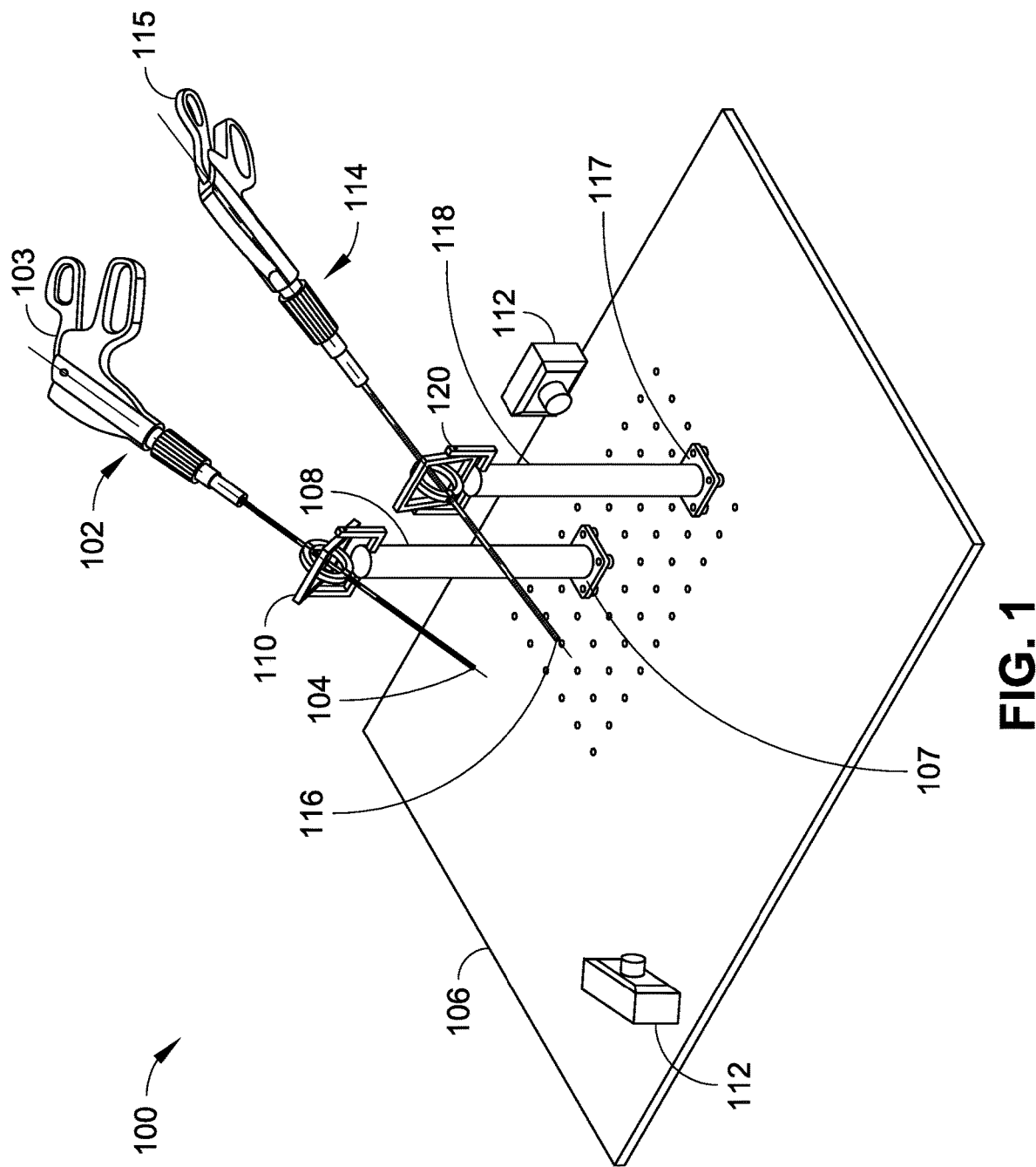
FIG. 1 is an isometric view of a system for surgical training, in accordance with an embodiment of this disclosure.

In FIG. 1, a system 100 for surgical training is illustrated according to an embodiment of this disclosure. The system 100 may include at least one surgical training tool 102, such as a laparoscopic instrument, a model of a laparoscopic instrument, or any other surgical instrument or model thereof. The surgical training tool 102 may include one or more fiducials coupled to the tool 102 or forming a portion of the tool 102. The fiducials may include, but are not limited to, active markers (e.g., LEDs), passive markers (e.g., reflectors), and/or recognizable features (e.g., tool structures or patterned surfaces).

In some embodiments, the surgical training tool 102 includes one or more fiducials at the tool tip 104 to enable tracking of the tip status. For example, the position of the one or more fiducials may indicate an open/close or active/inactive operating state of the tool tip, which may include a claw, prongs, a scissor, a needle, a razor blade, or the like. Alternatively, the tip status may be tracked by detecting the position of one or more fiducials located at a driving mechanism 103 of the tool tip 104. The driving mechanism 103 may include a handle, lever, button, knob, dial, or any other interface structure configured to actuate or affect the operating state of the tool tip 104.

The surgical training tool 102 may further include one or more fiducials located along a shaft leading to the tool tip 104, thereby facilitating detection of the orientation of the tool tip 104. Those skilled in the art will appreciate that the surgical training tool 102 may include any number of fiducials located at the tool tip 104 and/or other portions of the tool 102. Through the use of active/passive detection, image recognition, and/or pattern recognition, the fiducials are detectable to identify a position and orientation of the tool within a volume.

The system 100 may further include a support structure 108 configured to receive the surgical training tool 102, via an opening, joint, notch, or the like. In some embodiments, for example, the support structure 108 includes a pivotable receiving structure 110, such as a gimbal joint. The support structure 108 may constrain the tool movement within the volume, thus mimicking the limited movement that would be encountered in a minimally invasive surgical environment (e.g., tool manipulation through an incision).

In some embodiments, the system 100 further includes a platform 106 that defines the tool space. For example, the platform 106 may include indications for proper placement of the support structure 108 and at least two off-tool detectors 112. The support structure 108 may include a base 107 configured to removably attach to the platform 106, and similarly the off-tool detectors may include fasteners for coupling with the platform 106. It is noted, however, that the support structure 108 and/or the detectors 112 are not necessarily coupled with a platform or restricted to a fixed arrangement. Rather, the support structure 108 and the detectors 112 may be arranged with respect to the platform 106 or independent of a platform 106. In some embodiments, where the system 100 lacks or is independent of a platform, the support structure 108 and the detectors 112 may be arbitrarily positionable with respect to one another. As discussed in further detail below, a registration sequence between the surgical training tool 102 and the detectors 112 may be performed upon initiation to calibrate the detectors 112 and determine any needed repositioning.

The system 100 may further include at least a second surgical training tool 114 with one or more fiducials coupled thereto or forming a portion of the second tool 114. The one or more fiducials may be arranged to enable tracking of a position, orientation, and/or operating state of a tool tip 116 of the second surgical training tool 114, where the tool tip 116 may be actuated, opened/closed, or activated/deactivated by a driving mechanism 115 of the second tool 114. The second surgical training tool 114 may be positioned within a second support structure 118 (e.g., within a pivotable receiving structure 120 of the second support structure 118), where the second support structure may include a base 117 for attaching to a platform 106 or freely standing independent of a platform 106. In some embodiments, the first surgical training tool 102 and the second surgical training tool 114 may be at least partially supported and constrained by a single support structure (not shown). For example, a shared support structure may include two receiving structures, such as gimbal joints, each configured to receive a respective one of the first and second surgical training tools 102 and 114.

In some embodiments, the system 100 further includes a portable container configured to hold some or all of the foregoing components of system 100. The one or more support structures may be disassembled and/or collapsed to facilitate storage within the portable container. Further, the portable container may include designated compartments or supports that correspond to particular ones of the storable components of system 100. Accordingly, the surgical training tool 102 (and/or tool 114) and detectors 112 may be conveniently carried from one place to another, for example, from an instructional facility to home. In some embodiments, the detectors 112 may be connected or connectable to a processor, for example, linked via a wired or wireless connection to a personal computer or any other computing system. As such, the system 100 may be established at any site by connecting the detectors 112 to a computing system including a display device. Alternatively, the system 100 may include a portable display device coupled to a processor. Those skilled in the art will appreciate that the various components of system 100 that are described herein may be configured for use at a single site or for portability to multiple sites (e.g., a self-contained portable system or usable with any computing system).

Figure 2A:
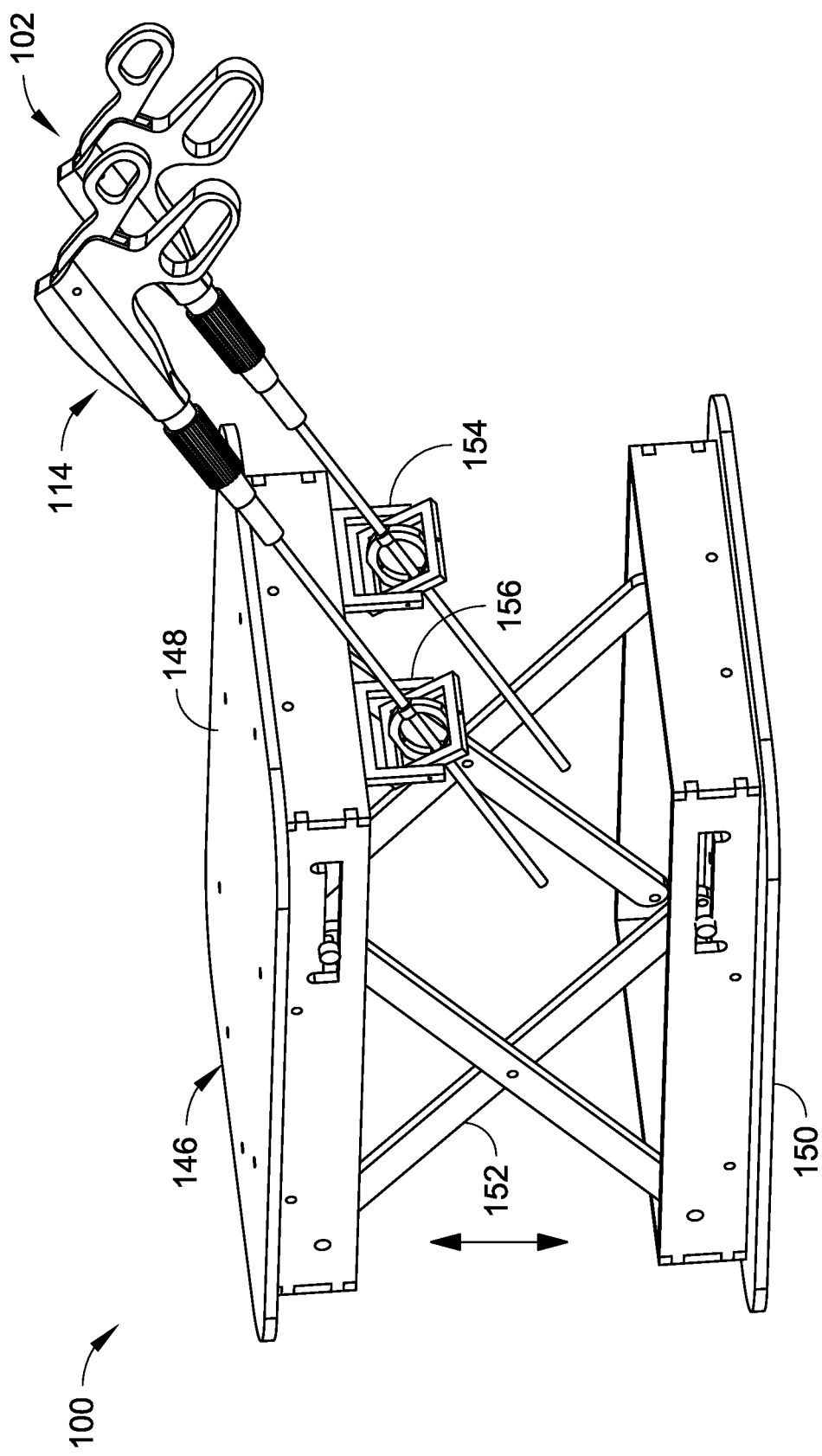
FIG. 2A is an isometric view of a surgical training system, where a portable support structure functions as a portable container for various storable components of the system, in accordance with an embodiment of this disclosure.
Figure 2B:
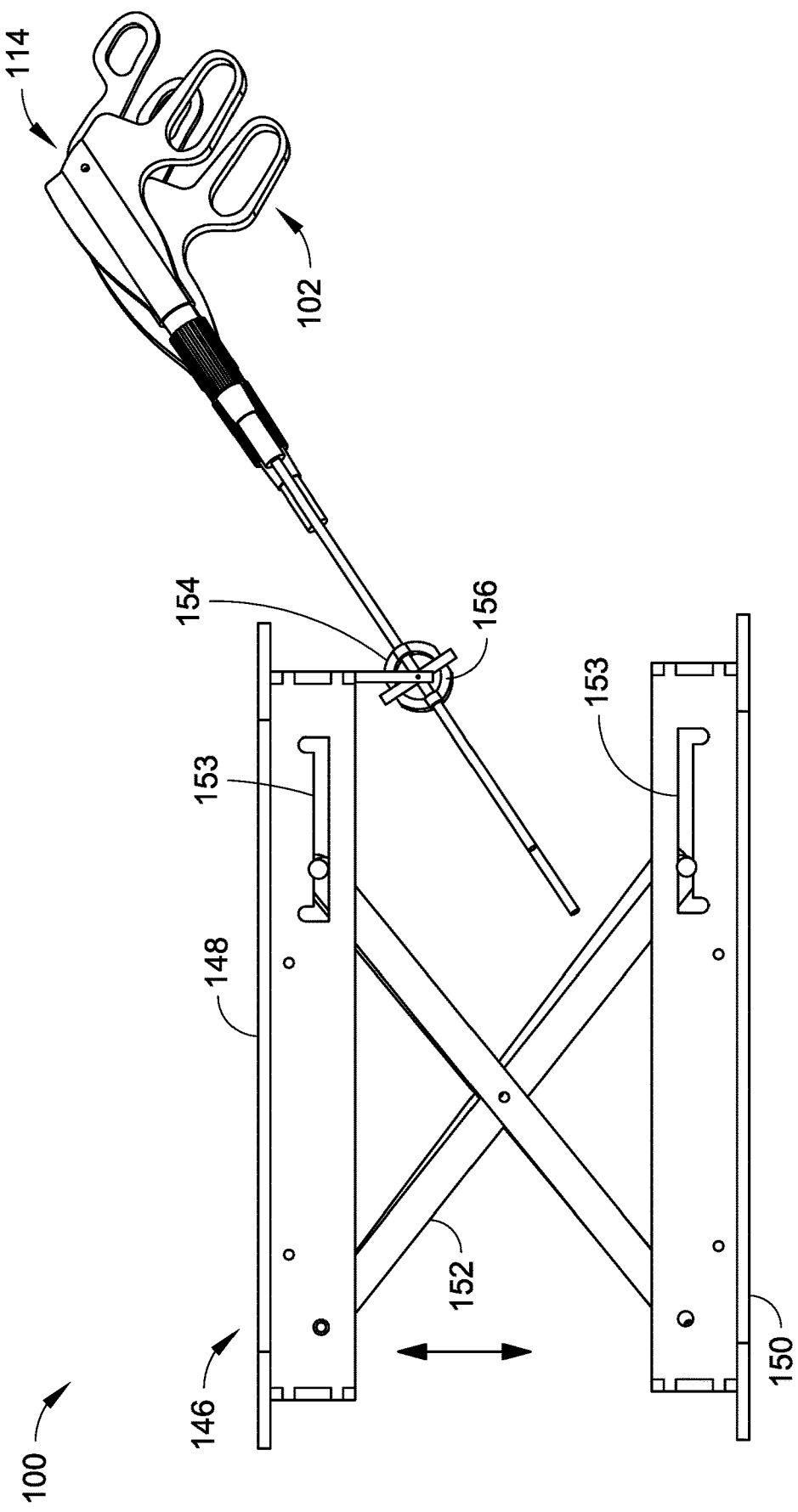
FIG. 2B is a side view of a surgical training system, where a portable support structure functions as a portable container for various storable components of the system, in accordance with an embodiment of this disclosure.

An embodiment of system 100 is illustrated in FIGS. 2A and 2B, where the system 100 includes a collapsible structure 146 configured to support the first surgical training tool 102 and/or the second surgical training tool 114. The collapsible structure 146 may further constrain the movement of the surgical training tools 102 and 114 within the volume. For example, the collapsible structure 146 may include a first receiving structure 154 configured to receive the first surgical training tool 102 and/or a second receiving structure 156 configured to receive the second surgical training tool 114. In some embodiments, the collapsible structure 146 is defined by a top surface 148 and a bottom surface 150 connected via a cross bars 152 in a scissor-like arrangement. As shown in FIG. 2B, the top surface 148 and the bottom surface 150 may be actuated towards one another in a closed position, where the cross bars 152 are moved from a first end (open position) to a second end (closed position) of one or more substantially linear openings 153 coupled with the top surface 148 and/or the bottom surface 150. In the closed position, the collapsible structure 146 may contain storable components of the system 100, as discussed above with regard to the portable container. In some embodiments, the off-tool detectors 112 coupled to or supported by the top surface 148 and/or the bottom surface 150. The top surface 148 and/or the bottom surface may further include one or more illumination sources (e.g., LEDs) configured to illuminate the volume within which the surgical training tool 102 is manipulated. In some embodiments, the illumination sources are configured to provide substantially uniform illumination within the volume to maintain a clear field of view for the detectors 112.

Figure 3:
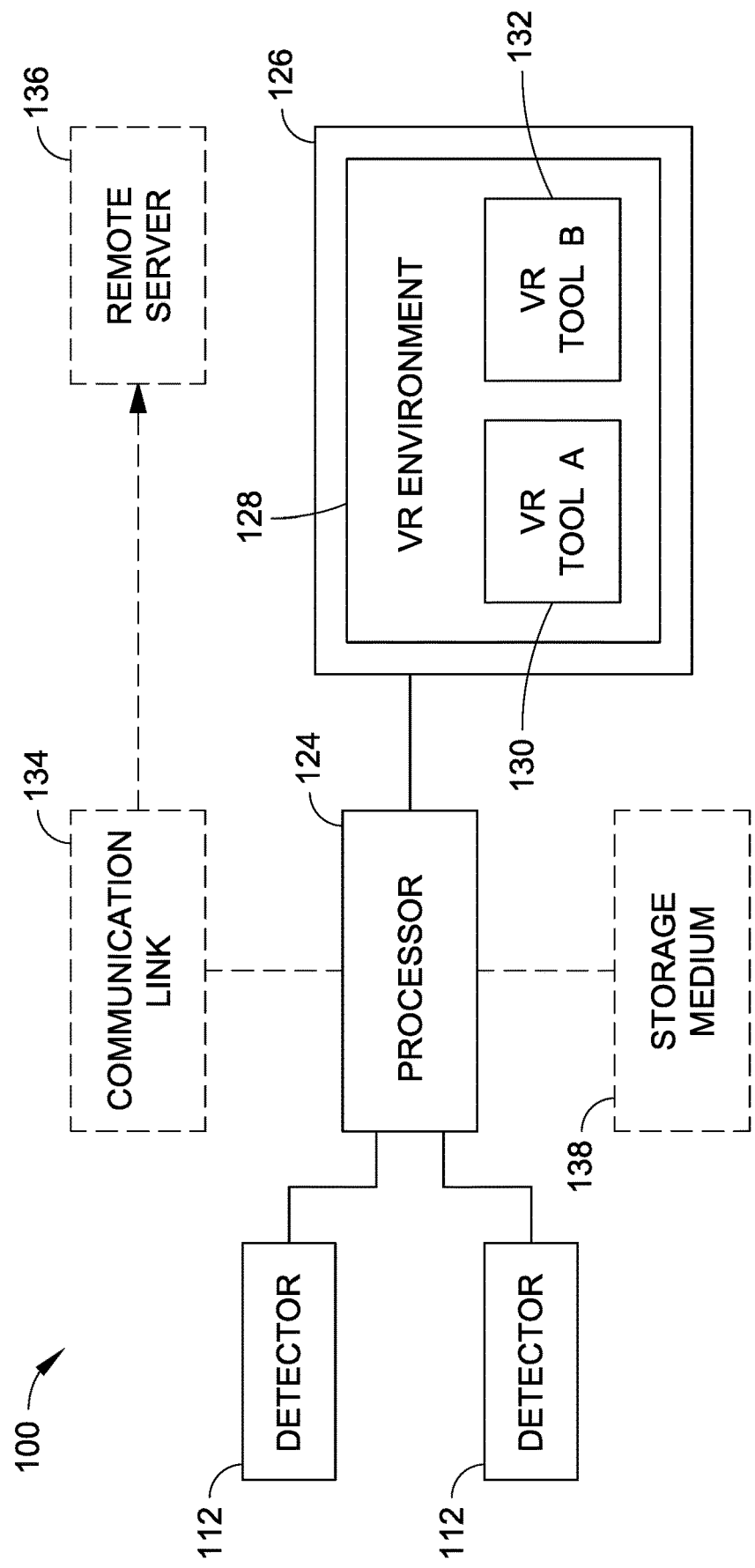
FIG. 3 is a block diagram illustrating a detection and simulation path of the surgical training system, in accordance with an embodiment of this disclosure.

FIG. 3 is a block diagram illustrating a detection and simulation path of the system 100. The system 100 may include at least one processor 124 in communication with the off-tool detectors 112. The detectors 112 may be configured to detect the position of the one or more fiducials of the first surgical training tool 102 and/or the second surgical training tool 114. Thereafter, a tool path may be generated by the processor 124 based on the detected position (e.g., three-dimensional coordinates) of the one or more fiducials relative to a reference point, such as a designated origin within the volume, a point between a first detector 112 and a second detector 112, or a point on or near one of the detectors 112.

In some embodiments, the detectors include cameras configured to stereoscopically image the volume within which the surgical training tool 102 is operating. By extracting the position coordinates of the one or more fiducials from a series of stereoscopic images, the tool path may be constructed by the processor. For example, the processor may record a path of tool coordinates over time. The tool path may further include tool orientation and/or information regarding the operating state of the tool tip 104. In this regard, the tool path may include a data construct formed from several attributes (e.g., position, orientation, tool tip operating state) that are tracked by detecting fiducial positions over time.

The system 100 may further include a display device 126, such as an LCD, LED, CRT, or plasma display, virtual reality (VR) goggles, a holographic display, a projector, or any other 2D or 3D graphical display. The tool path may by mapped by the processor 124 to a virtual rendering 130 of the surgical training tool 102 in a virtual operative environment 128 that is visually observable via the display device 126. Accordingly, performance of an operative task within the virtual operative environment 128 is possible utilizing the virtual surgical training tool 130, where the virtual tool 130 is manipulated based on the tool path (e.g., the mapped position coordinates of the fiducials detected in real time). In some embodiments, where a second surgical training tool 114 is also tracked, the processor 124 may be further configured to generate a second tool path based on the detected position of one or more fiducials of the second surgical training tool 114. The processor may be further configured to map the second tool path to a virtual rendering 132 of the second surgical training tool 114.

Figure 4A:
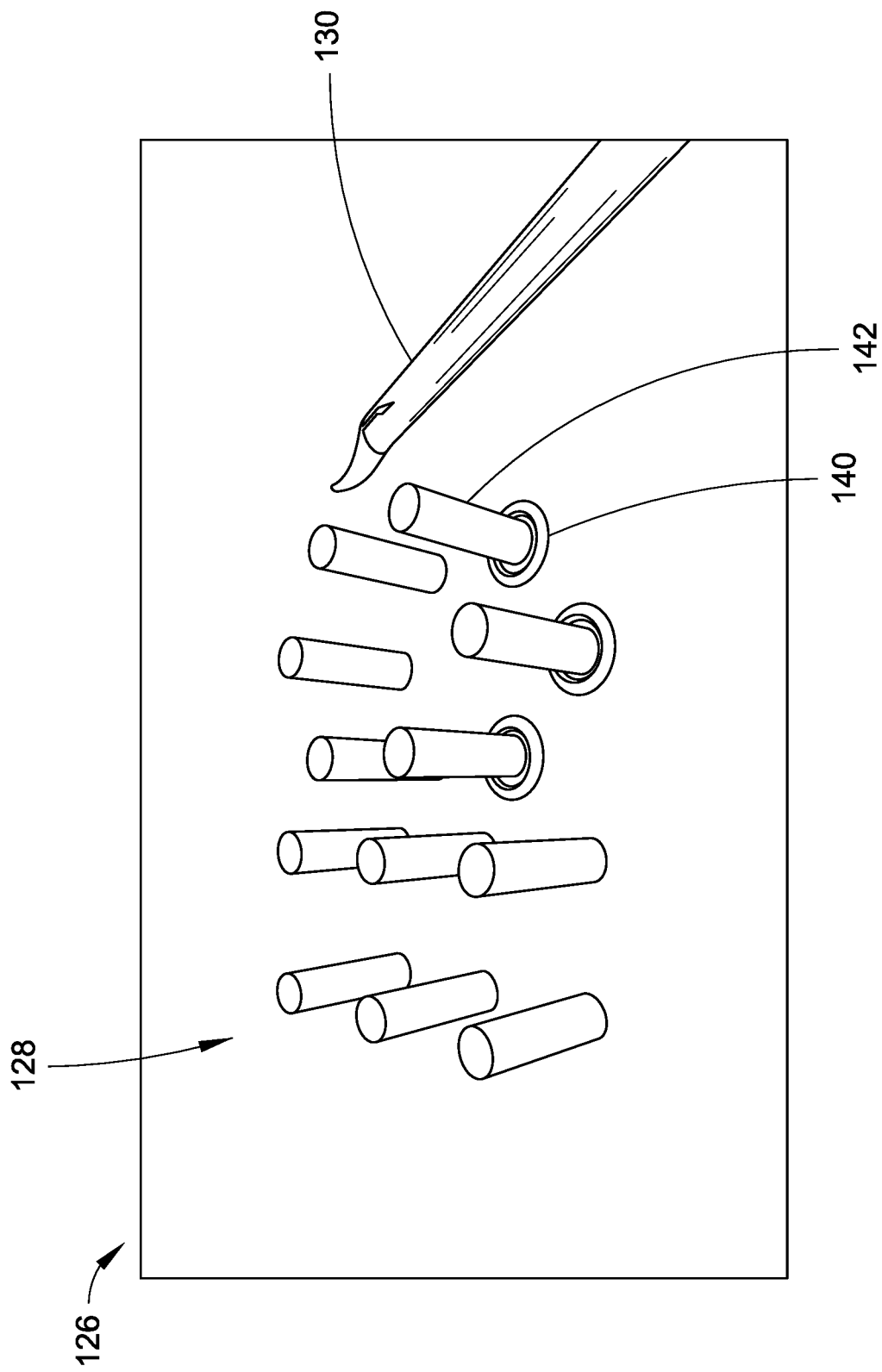
FIG. 4A is a conceptual illustration of a visually observable virtual rendering of a surgical training tool in a virtual operative environment, in accordance with an embodiment of this disclosure.

The virtual operative environment 128 observable via the display device 126 may facilitate single or multiple tool training with operative tasks targeting certain skills. FIG. 4A illustrates an embodiment where the virtual operative environment 128 includes a task training environment. For example, the virtual operative environment 128 may include one or more moveable structures 140 (e.g., rings) and one or more stationary structures 142 (e.g., pegs). In the peg transfer exercise, the operative task is to transfer a ring from one peg to another peg. Other possible exercises include, but are not limited to, precision cutting along a specified path, rope running, needle passing, intracorporeal knot tying, extracorporeal knot tying, mesh alignment, and/or suturing. FIG. 4B illustrates an embodiment where the virtual operative environment 128 includes a more advanced surgical training environment. For example, surgical training simulations may include a virtual operative environment 128 akin to actual operating conditions. In this regard, the surgical training environment may include a virtual rendering of at least one anatomical structure 144. The operative task may include the performance of an operation (e.g., cutting or suturing) upon the anatomical structure 144. To facilitate progressive skill training, fundamental skill building simulations (e.g., simulations within a task training environment) may be completed, and afterwards, the virtual operative environment 128 may transition into more realistic surgical simulations (e.g., simulations within a surgical training environment).

The system 100 may further include one or more visual indicators 131 and/or 133 conveying simulation data such as, but not limited to, tool metrics (e.g., speed, positioning, direction, orientation, and/or acceleration), simulation time, current performance, averaged performance, task completion rate, an amount or number of tasks performed, percentage completed, number of errors, error rate, and/or accuracy. As shown in FIG. 4B, the one or more indicators 131 and/or 133 may be observable via the display device 126. In some embodiments, a first indicator 131 may convey simulation data pertaining to the first virtual surgical tool 130, and a second indicator 133 may convey simulation data pertaining to the second surgical tool 132. Further, as discussed above, the system 100 may include one or more indicators conveying information pertaining to both tools or to the overall simulation. In some embodiments, the system 100 may further include haptic feedback devices (e.g., resistance servos and/or vibrators) coupled to the surgical training tool 102 to simulate forces encountered in the virtual operative environment 128.

Figure 5:
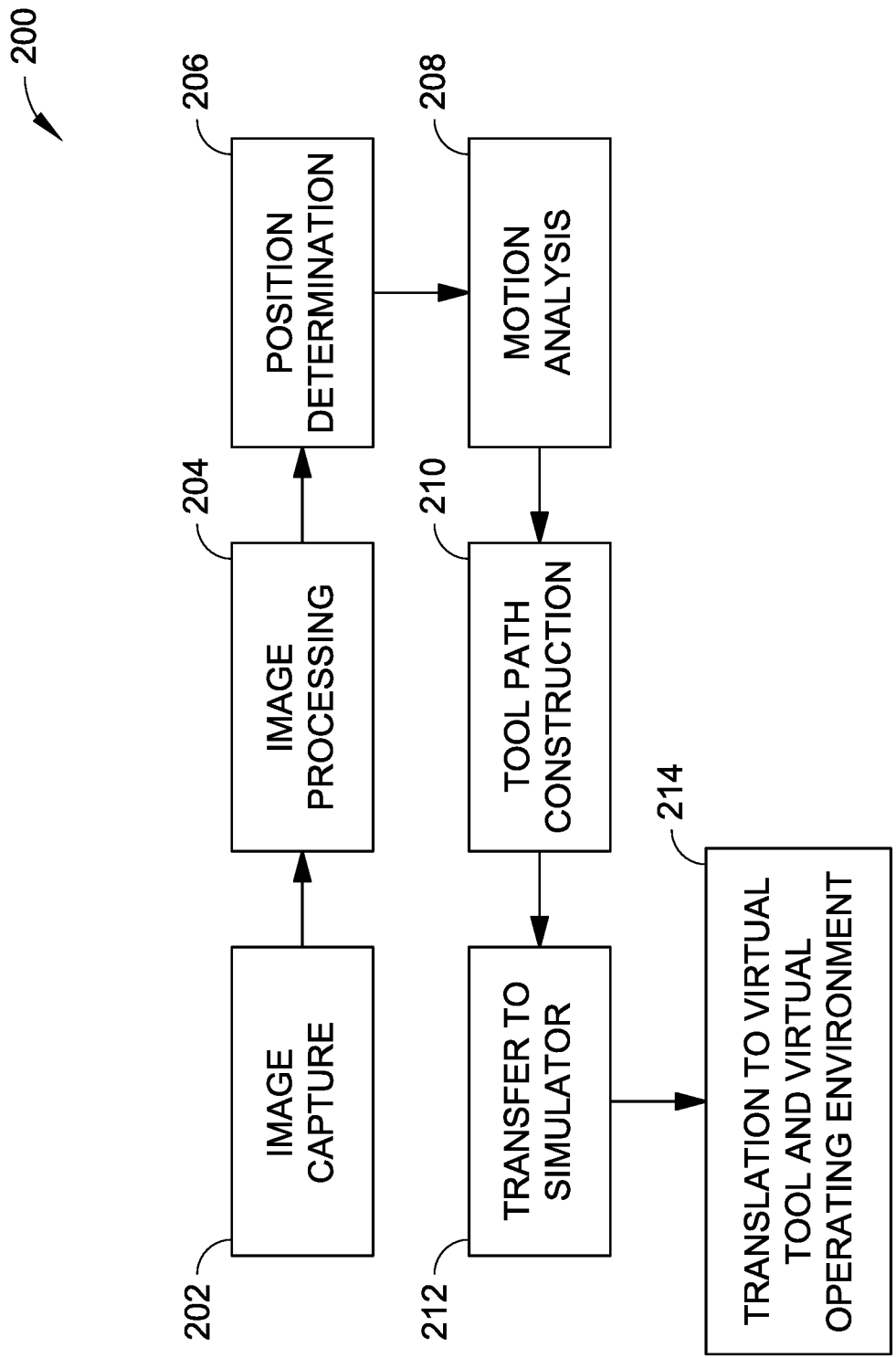
FIG. 5 is a flow diagram illustrating a method of tracking a tool path of a surgical training tool and translating the tool path into a virtual rendering of a surgical training tool in a virtual operative environment, in accordance with an embodiment of this disclosure.

A flow diagram in FIG. 5 illustrates an embodiment of a method 200 for tool tracking and simulation. The processor 124 may be configured to execute one or more software modules or instruction sets to perform the steps of method 200. At step 202, image frames or spectral data may be collected with the off-tool detectors 112. At step 204, the detected frames or spectral data are processed to locate the one or more fiducials. At step 206, the fiducials coordinates are translated into a position of the surgical training tool 102 or, more particularly, the position coordinates of the tool tip 104. In some embodiments, the method 200 further includes a motion analysis step 208, where changes in fiducial positioning between frames can be used to determine changes in orientation, trajectory, and/or operating state of the tool tip 104. At step 210, a tool path is generated with the position determination over a series of image frames and, in some embodiments, the motion analysis data. At step 212, the tool path is fed (in real time) to a simulation module. At step 214, the simulation module, running on the processor 124, converts the tool path into motions of the virtual surgical training tool 130 within the virtual operative environment 128.

The processor 124 may generate a task path describing a path of the virtual surgical training tool 130 relative to the virtual operative environment 128. The task path or a set of task paths may include position coordinates of the virtual surgical training tool 130 relative to the position coordinates of one or more virtual structures (e.g., structure 140, 142, or 144) being operated upon within the virtual environment 128. Further, the task path or paths may include time-indexed events, such as performed operative tasks, errors (e.g., dropped objects, misaligned cuts, and/or deviations beyond spatial thresholds), and other performance related attributes (e.g., tool steadiness, speed, accuracy, and/or precision).

Figure 6A:
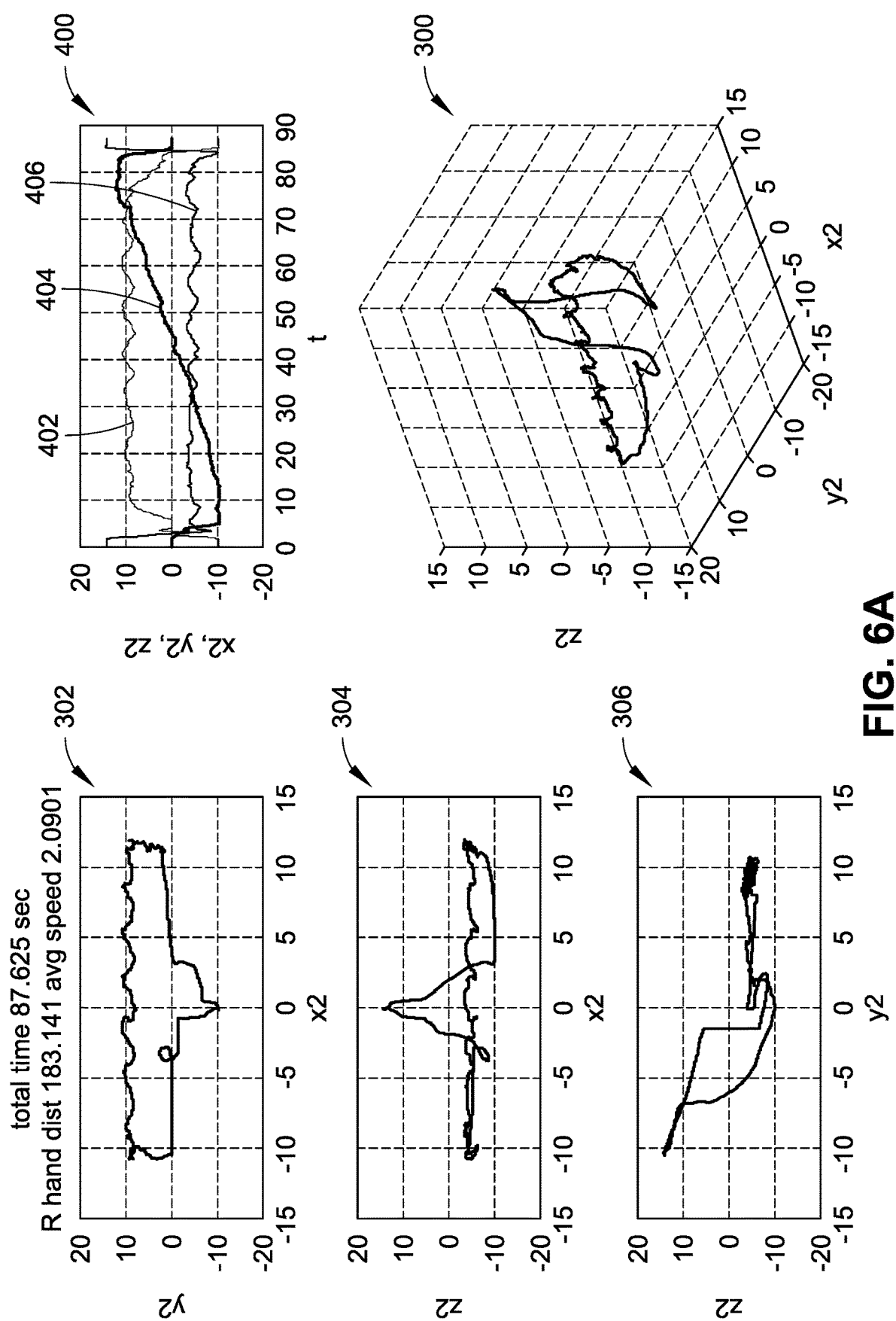
FIG. 6A graphically represents a tool path, in accordance with an embodiment of this disclosure.
Figure 6B:
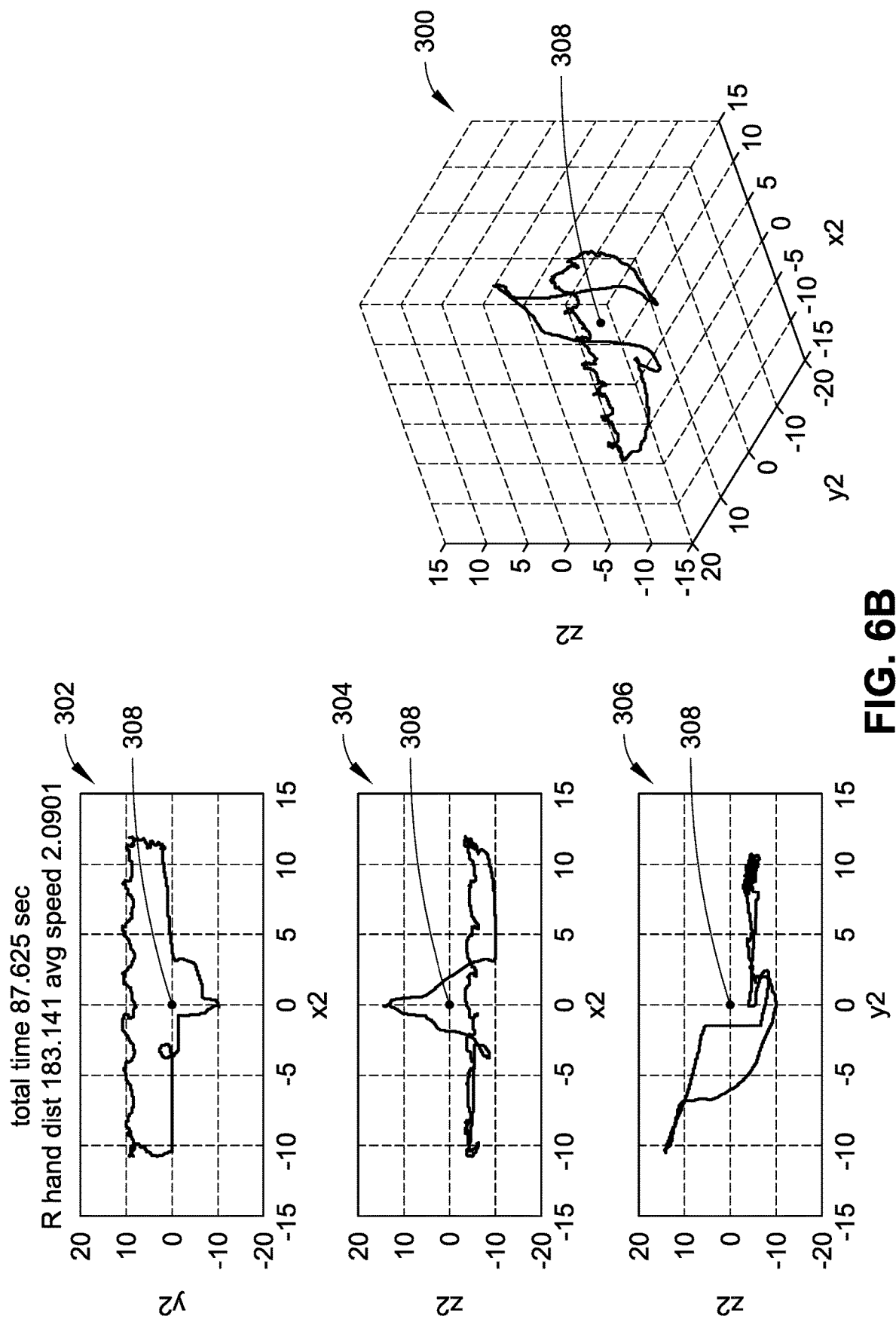
FIG. 6B graphically represents a task path based on the tool path, in accordance with an embodiment of this disclosure.
Figure 6C:
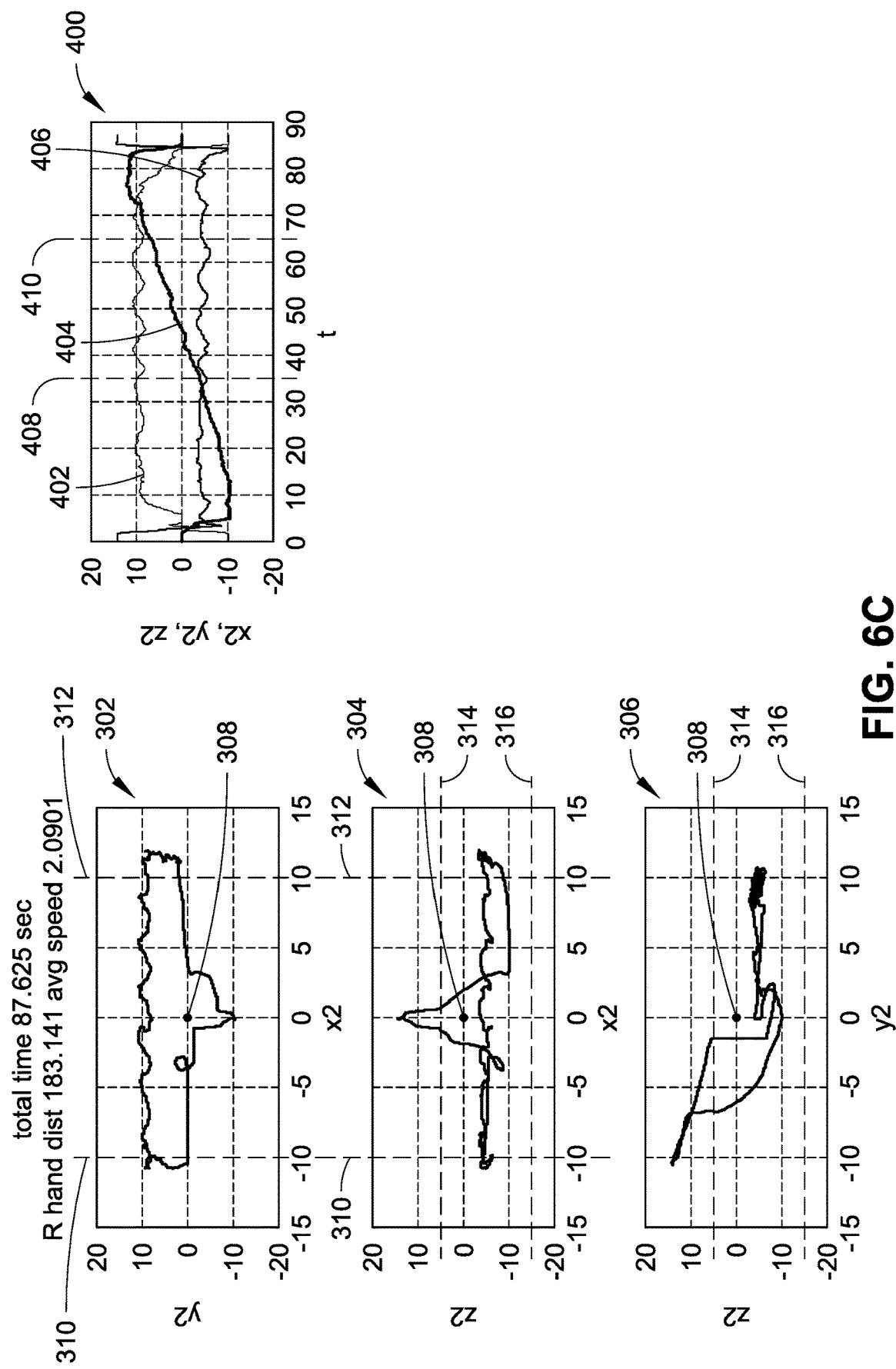
FIG. 6C graphically represents a task path relative to one or more assessment variables, in accordance with an embodiment of this disclosure.

FIGS. 6A through 6C illustrate the tool path and the relationship between the tool path and the task path according to various embodiments of this disclosure. Looking to FIG. 6A, a three-dimensional plot 300 is illustrative of the tool path relative to an origin established between the detectors 112 and the surgical training tool 102. In some embodiments, the origin may be established prior to initiating a tool tracking sequence by performing a calibration exercise with the surgical training tool 102. FIG. 6A further illustrates a first two-dimensional plot 302 of the tool path in the X-Y plane, a second two-dimensional plot 304 of the tool path in the X-Z plane, and a third two-dimensional plot 306 of the tool path in the Y-Z plane. Further, a time-indexed plot 400 of the tool path is shown including individual traces 402, 404, and 406 for the detected X, Y, and Z coordinates, respectively, over time.

As shown in FIG. 6B, the tool path can be referenced to coordinates 308 of one or more virtual structures (e.g., structure 140, 142, or 144) to generate a task path. In some embodiments, the task path includes a shifted version of the tool path about an origin defined by the coordinates 308 of a virtual structure. In FIG. 6B, the virtual structure coordinates happen to be at the same origin; however, those skilled in the art will appreciate that the virtual structure coordinates 308 may shift the tool path about a different origin. In some embodiments, the task path may simply include the coordinates of one or more virtual structures in addition to the tool path, thereby documenting deltas between the tool path and the coordinates of one or more virtual structures. In FIG. 6C, spatial boundaries are illustrated. For example, boundary lines 310 and 312 illustrate movement tolerances along the X-axis, and boundary lines 314 and 316 illustrate movement tolerances along the Z-axis. In some embodiments, the task path may be assessed based on the time or extent of the tool path that is in/out of the spatial boundaries. Further, as discussed above, the smoothness or steadiness of the tool path may be objectively assessed.

As further shown in FIG. 6C, one or more timing events (e.g., events 408 and 410) or intervals (e.g., time between events 408 and 410) may exist in the time domain. In some embodiments, an event 408 may include a benchmark, such as performance of a certain operative task or a portion thereof, where the task path may be assessed by comparing the performance of an operative task to a benchmark for performing the operative task. In some embodiments, two events 408 and 410 may define an interval wherein spatial boundaries are changed. For example, the spatial boundaries may become tighter or looser with respect one or more of the axes as the task path progresses beyond a first operative task to a second operative task. Further, as discussed above, the task path may include certain time-indexed events. In some embodiments, an objective assessment may be based upon the performance or non-performance of certain events within a time interval, and/or the task path may be assessed based on an error threshold established for a time interval between two events (e.g., events 408 and 410).

The task path can be analyzed in real-time, periodically, at specified triggering events (e.g., events 408 and 410), or post-performance of an operative task to establish an objective assessment of the task performance. Looking again to FIG. 3, the processor 124 may be configured to provide a continuous, periodic, event-triggered, or post-performance assessment of the operative task. Alternatively or in addition to providing a performance assessment, the processor 124 may be configured to store the task path and/or a recording of the virtual surgical tool 102 being manipulated within the virtual operative environment 128 to a storage medium such as, but not limited to, a flash drive, a hard-disk drive, a solid-state disk drive, or an optical disk. The stored task path or the recording may be retrieved and assessed at a later time by the processor 124 or at another site, such as an instructional facility.

In some embodiments, the system 100 further includes a communication link, such as wired or wireless transmitter, configured to send the task path and/or a recording of the virtual surgical tool 130 being manipulated within the virtual operative environment 132 to a remote server 136 for assessment. Further, the displayed rendering of the virtual surgical tool 130 and the virtual operative environment 128, and/or any other software modules may be accessible from the remote server 136 via the communication link 134. In some embodiments, one or more access links to one or more simulations are provided through a web portal observable via the display device 126 or another user interface. The web portal may provide access to a selectable set of virtual operative environments supporting one or more virtual surgical tools and/or a customizable environment. Alternatively, the simulations may be stored on a non-transitory carrier medium, such as the storage medium 138, that is communicatively coupled to the processor 124.

Figure 7:
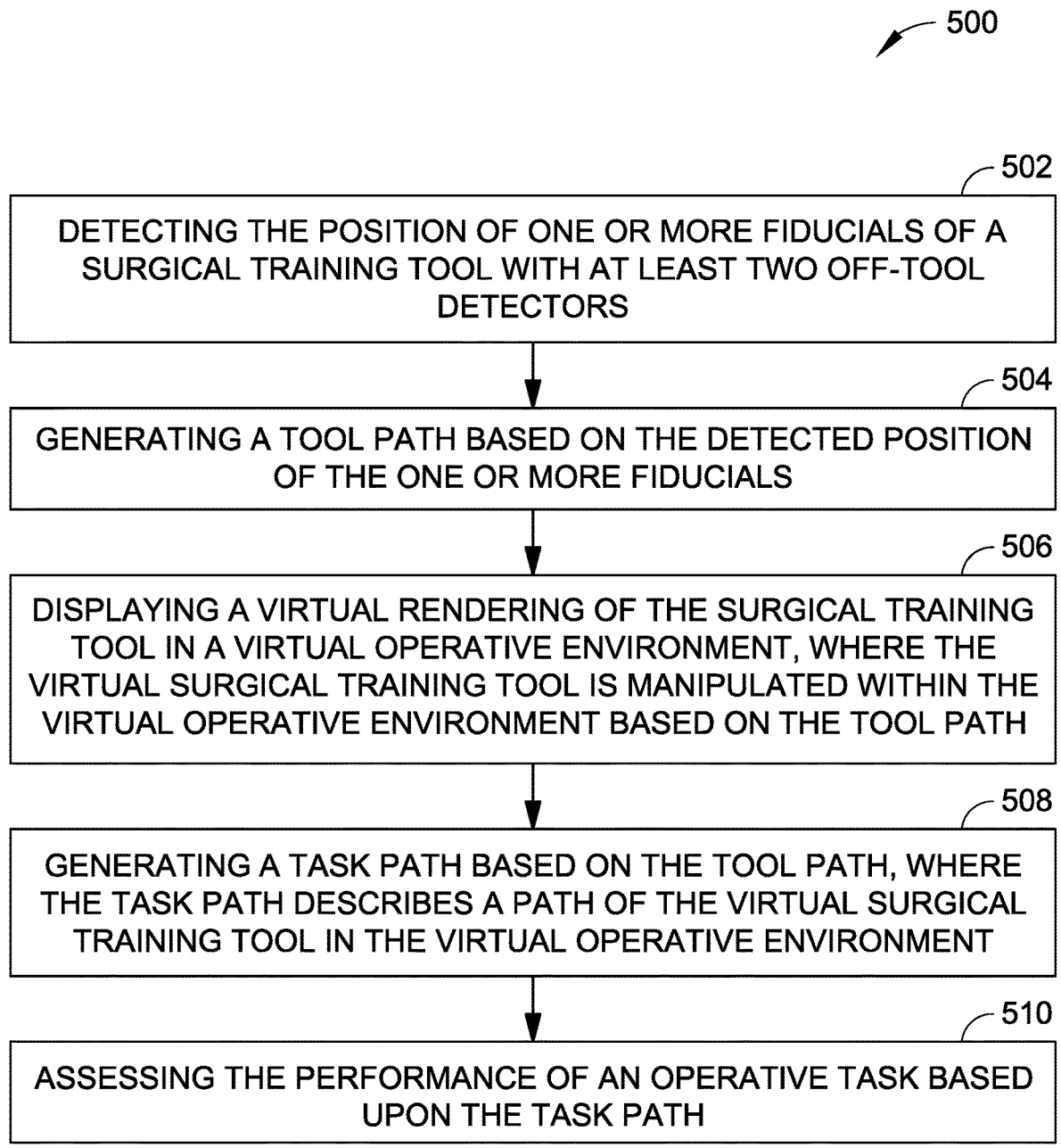
FIG. 7 is a flow diagram illustrating a method of surgical training, in accordance with an embodiment of this disclosure.

FIG. 7 is a flow diagram illustrating an embodiment of a method 500 of surgical training. In some embodiments, method 500 is manifested by an embodiment of system 100; however, those skilled in the art will appreciate that the method 500 may be carried out by any system configured to perform the following steps. At step 502, at least two off-tool detectors 112 may detect the position of one or more fiducials of a surgical training tool 102. At step 504, a tool path is generated based on the detected position of the one or more fiducials. At step 506, a virtual rendering of the surgical training tool 130 in a virtual operative environment 128 is presented via a display device 126, where the virtual surgical training tool 130 is manipulated in the virtual operative environment 128 based on the tool path. Accordingly, a trainee is enabled to perform an operative task within the virtual operative environment 128 utilizing the virtual surgical training tool 130. At step 508, a task path is generated based on the tool path, where the task path describes a path of the virtual surgical training tool 130 in the virtual operative environment 128. In this regard, the task path includes position coordinates of the virtual surgical training tool 130 relative to position coordinates of one or more structures being operated on by the virtual surgical training tool 130 in the virtual operative environment 128. In some embodiments, certain time-indexed events are also included in the task path or a set of task paths (as discussed above). At step 510, the performance of one or more operative tasks (i.e., one or more simulation objectives) is assessed based upon the task path. The task performance may be assessed continuously, periodically, upon the occurrence of certain triggering events, or post-performance of the one or more operative tasks (e.g., post-simulation) by an on-site processor 124 or remotely, for example, by a remote server 136.

Those having skill in the art will appreciate that there are various vehicles by which processes and/or systems and/or other technologies described herein can be embodied (e.g., hardware, software, and/or firmware), and that the preferred vehicle will vary with the context in which the processes and/or systems and/or other technologies are deployed. In some embodiments, various steps, functions, and/or operations are carried out by one or more of the following: electronic circuits, logic gates, multiplexers, programmable logic devices, ASICs, analog or digital controls/switches, microcontrollers, or computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a carrier medium. Program instructions implementing methods such as those described herein may be transmitted over or stored on carrier media. A carrier medium may include a transmission medium such as a wire, cable, or wireless transmission link. The carrier medium may also include a storage medium such as a read-only memory, a random access memory, a magnetic or optical disk, or a magnetic tape.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A system for surgical training, comprising:
   a surgical training tool, the surgical training tool including one or more fiducials;
   at least two detectors configured to detect the position of the one or more fiducials;
   at least one processor in communication with the at least two detectors;
   a tool path generated by the at least one processor based on the detected position of the one or more fiducials; and
   at least one task path generated and graphically presented by the at least one processor based on the tool path, the at least one task path describing a path of the surgical training tool in a virtual operative environment, the at least one task path including a plot of position coordinates of the surgical training tool relative to position coordinates of one or more structures being operated on by the surgical training tool in the virtual operative environment over time, the at least one task path further including time-indexed events based on the tool path, wherein the time-indexed events include performed operative tasks and detected errors indicated with markings at respective x, y, and z coordinates relative to time on the at least one task path in addition to a graphically represented plot of the position coordinates of the surgical training tool relative to the position coordinates of one or more structures being operated on by the surgical training tool in the virtual operative environment over time, and wherein the markings that indicate the time-indexed events are distinguishable from the plot of the position coordinates.

2. The system of claim 1, further comprising:
   a virtual rendering of the surgical training tool in the virtual operative environment, the virtual rendering of the surgical training tool being visually observable via a display device, an operative task being performed within the virtual operative environment utilizing the surgical training tool presented by the display device, the surgical training tool being manipulated based on the tool path.

3. The system of claim 1, wherein the time-indexed events include at least a first event and a second event, and wherein a first time interval for the first event requires a first set of spatial boundaries for the at least one task path and a second time interval for the second event requires a second set of spatial boundaries for the at least one task path that is different from the first set of spatial boundaries.

4. The system of claim 3, wherein a first error threshold is established for the first time interval and a second error threshold is established for the second time interval.

5. The system of claim 1, wherein the detected errors include one or more of: a dropped object, a misaligned cut, or a deviation beyond a spatial threshold.

6. The system of claim 1, wherein the at least one processor is further configured to:
assess the performance of an operative task based upon the at least one task path by evaluating time-indexed events within a time interval for the operative task to determine performance or non-performance of events required by the operative task and based on an error threshold for the operative task.

7. The system of claim 1, further comprising:
a storage medium configured to store the at least one task path or a recording of the surgical training tool being manipulated within the virtual operative environment; and
a communication link configured to transfer the at least one task path or a recording of the surgical training tool being manipulated within the virtual operative environment to a remote server for assessing the performance of an operative task based upon the at least one task path or the recording of the surgical training tool being manipulated within the virtual operative environment.

8. The system of claim 1, wherein the at least two detectors include two or more cameras configured for stereoscopic imaging, and wherein the one or more fiducials include one or more traceable markers or recognizable features included in or coupled to the surgical training tool.

9. The system of claim 1, wherein the markings intersect the plot of the position coordinates.

10. The system of claim 1, wherein the markings comprise vertical lines disposed at respective x, y, and z coordinates relative to time on the at least one task path.

11. A system for surgical training, comprising:
at least two detectors configured to detect the position of a surgical training tool;
at least one processor in communication with the at least two detectors;
a tool path generated by the at least one processor based on the detected position of the surgical training tool; and
at least one task path generated and graphically presented by the at least one processor based on the tool path, the at least one task path describing a path of the surgical training tool in a virtual operative environment, the at least one task path including a plot of position coordinates of the surgical training tool relative to position coordinates of one or more structures being operated on by the surgical training tool in the virtual operative environment over time, the at least one task path further including time-indexed events based on the tool path, wherein the time-indexed events include performed operative tasks and detected errors indicated with markings at respective x, y, and z coordinates relative to time on the at least one task path in addition to a graphically represented plot of the position coordinates of the surgical training tool relative to the position coordinates of one or more structures being operated on by the surgical training tool in the virtual operative environment over time, and wherein the markings that indicate the time-indexed events are distinguishable from the plot of the position coordinates.

12. The system of claim 11, further comprising:
a virtual rendering of the surgical training tool in the virtual operative environment, the virtual rendering of the surgical training tool being visually observable via a display device, an operative task being performed within the virtual operative environment utilizing the surgical training tool presented by the display device, the surgical training tool being manipulated based on the tool path.

13. The system of claim 11, wherein the time-indexed events include at least a first event and a second event, and wherein a first time interval for the first event requires a first set of spatial boundaries for the at least one task path and a second time interval for the second event requires a second set of spatial boundaries for the at least one task path that is different from the first set of spatial boundaries.

14. The system of claim 13, wherein a first error threshold is established for the first time interval and a second error threshold is established for the second time interval.

15. The system of claim 11, wherein the detected errors include one or more of: a dropped object, a misaligned cut, or a deviation beyond a spatial threshold.

16. The system of claim 11, wherein the at least one processor is further configured to:
assess the performance of an operative task based upon the at least one task path by evaluating time-indexed events within a time interval for the operative task to determine performance or non-performance of events required by the operative task and based on an error threshold for the operative task.

17. The system of claim 11, further comprising:
a storage medium configured to store the at least one task path or a recording of the surgical training tool being manipulated within the virtual operative environment; and
a communication link configured to transfer the at least one task path or a recording of the surgical training tool being manipulated within the virtual operative environment to a remote server for assessing the performance of an operative task based upon the at least one task path or the recording of the surgical training tool being manipulated within the virtual operative environment.

18. The system of claim 11, wherein the at least two detectors include two or more cameras configured for stereoscopic imaging.

19. The system of claim 11, wherein the markings intersect the plot of the position coordinates.

20. The system of claim 11, wherein the markings comprise vertical lines disposed at respective x, y, and z coordinates relative to time on the at least one task path.

* * * * *